Nov. 30, 1948.   C. W. INGELS   2,455,011
THERMAL ALARM APPARATUS
Filed May 23, 1946   3 Sheets-Sheet 1

INVENTOR.
Clarence W. Ingels
BY
ATTORNEY

Nov. 30, 1948.
C. W. INGELS
2,455,011
THERMAL ALARM APPARATUS
Filed May 23, 1946
3 Sheets-Sheet 2
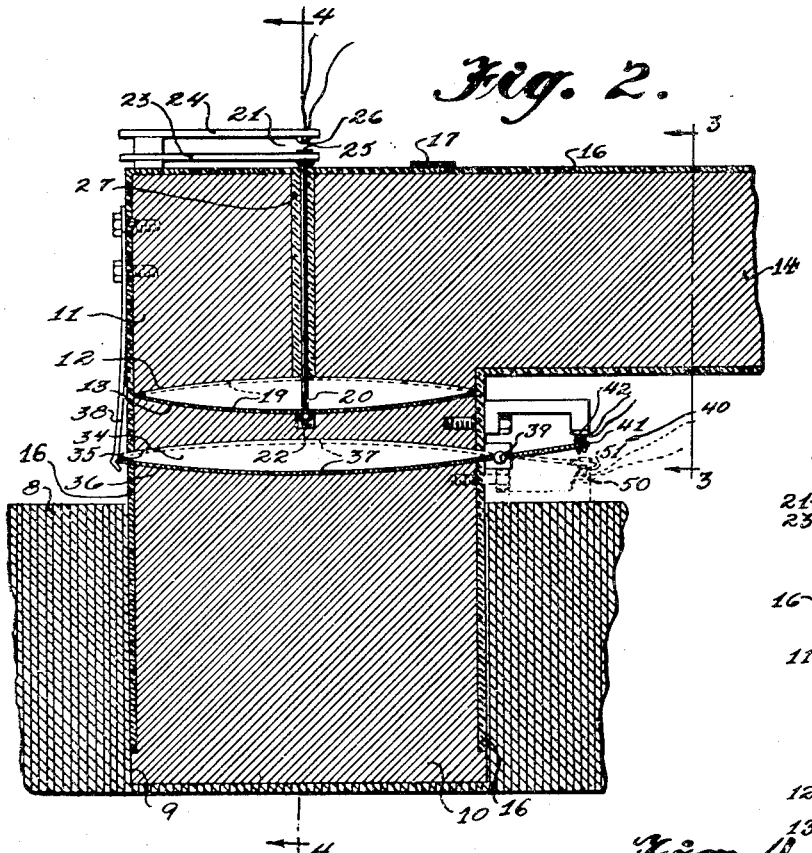
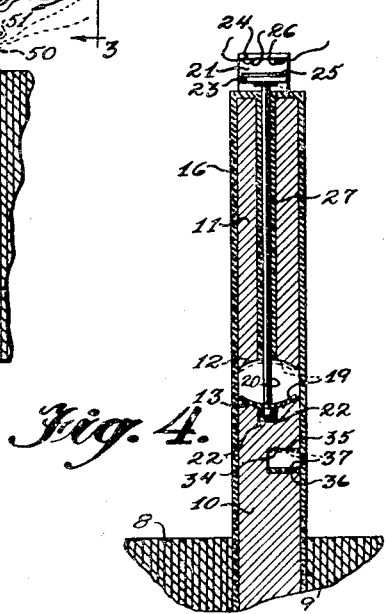
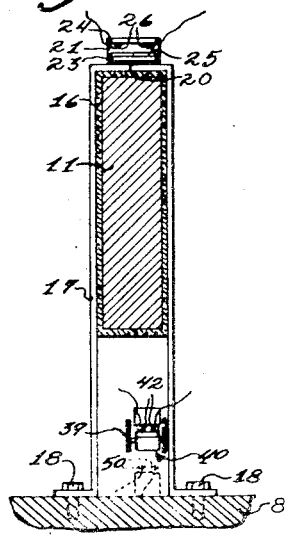
INVENTOR.
Clarence W. Ingels
BY
ATTORNEY.

Nov. 30, 1948.  C. W. INGELS  2,455,011
THERMAL ALARM APPARATUS
Filed May 23, 1946  3 Sheets-Sheet 3
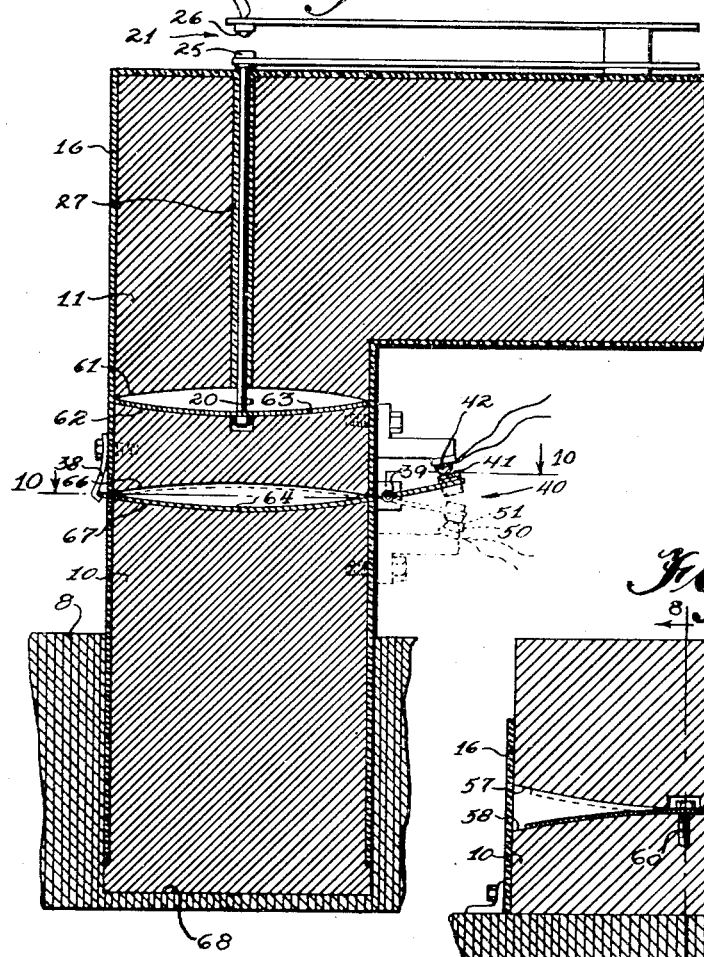
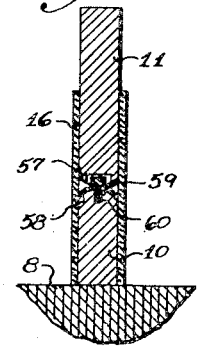
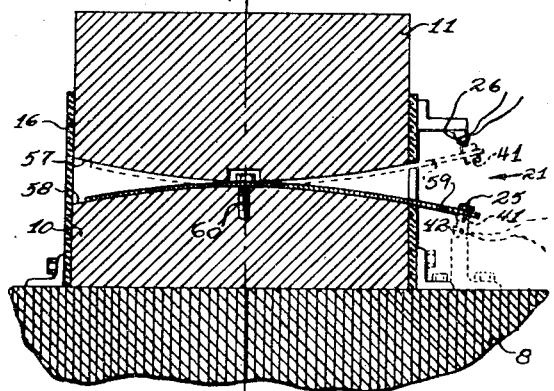
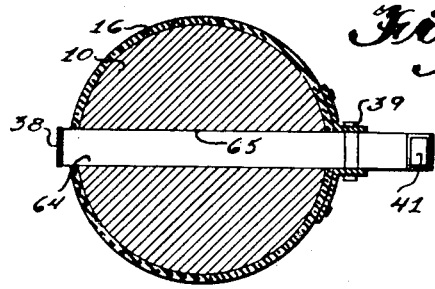
INVENTOR.
Clarence W. Ingels
BY
ATTORNEY Patented Nov. 30, 1948

2,455,011

UNITED STATES PATENT OFFICE 2,455,011

THERMAL ALARM APPARATUS

Clarence W. Ingels, St. Albans, N. Y.

Application May 23, 1946, Serial No. 671,885

16 Claims. (Cl. 177—311)

1

This invention relates to electric equipment protective systems and more particularly to signalling means for indicating when the temperature of electrical translating devices nearly becomes excessive. Electrical translating devices, such as electric motors, generators, and transformers, are subject to overloads, short circuits, faulty ventilation, and other conditions which give rise to excessive temperatures that may damage the device. Existing protecting devices provide visible or audible indications when electric equipment reaches a predetermined critical temperature, such as the highest safe operating temperature of a motor, generator, or a transformer. Still other devices protect electrical equipment against excessive temperatures by shutting off the power supply of an electric motor or removing the load from a generator or a transformer when the critical temperature is reached. Such actions, while protecting the device, in some instances, are not entirely desirable and could be prevented if it were known that the critical temperature was being approached. By providing the operator of electrical equipment with knowledge that an increasing overload exists or that the temperature is approaching a dangerous value, he can decrease or release the load on the device before the critical temperature is reached, thereby reducing the temperature without complete stoppage of the device in the case of motors and generators. Furthermore, by providing the operator with knowledge that the temperature is decreasing, the load may more safely be reapplied or increased.

Therefore, it is an object to this invention to provide signalling means which indicates when the temperature of an electrical translating device nearly reaches a predetermined critical value.

Another object of this invention is to provide signalling means for electrical translating devices which indicates the rate of temperature increase or decrease when the temperature approaches an excessive value.

A further object of this invention is to provide an automatic safety device for shutting off the power to or removing the load from a translating device when a critical temperature is reached together with signalling means to indicate when the temperature of the translating device has nearly reached the point where the safety device will operate.

Still another object of this invention is to provide temperature indicating means for translating devices that is responsive directly to the temperature of the hottest parts of the equipment and not to any variable ambient temperatures.

Other objects and advantages of the invention will be apparent from the following description and accompanying drawings in which:

Figure 2 is an enlarged cross sectional view of a part of the switch mechanism of Figure 1.

Figure 3 is a cross sectional view taken on line 3—3 of Figure 2.

Figure 4 is a cross sectional view taken on line 4—4 of Figure 2.

Figure 7 is a cross sectional view corresponding to Figure 2 of a modification of my device.

Figure 8 is a cross sectional view taken on line 8—8 of Figure 7.

Figure 9 is a cross sectional view corresponding to Figure 2 of another modification of my device.

Figure 10 is a cross sectional view taken on line 10—10 of Figure 9.

Figure 1:
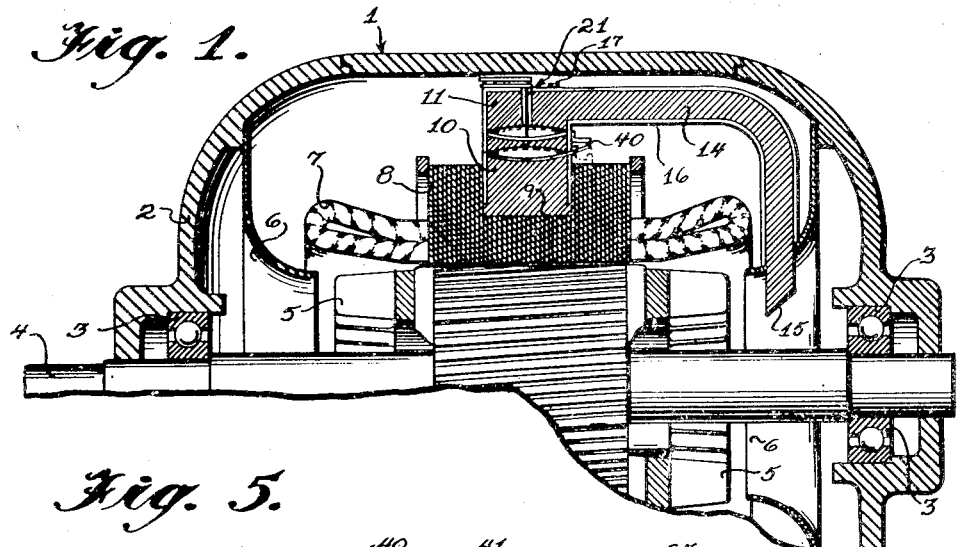
Figure 1 is a fragmentary cross sectional view of an electric induction motor incorporating the present invention.

Referring now to Figure 1, there is shown my invention applied to a conventional three phase electric induction motor indicated generally by 1. The motor is provided with a housing 2 supporting bearings 3 in which is journalled a rotor shaft 4. The rotor is provided with fan blades 5. At each end of the housing are air inlet bells 6 which admit air to cool the motor. Stator windings 7 are mounted in the usual slots provided in the inner side of the annular laminated core 8.

The current flowing through the stator windings 7 develops considerable heat which is fairly rapidly dissipated from the exposed ends of the windings. That portion of the windings, however, which is embedded in the slots in the core 8 more nearly reflects the absolute temperature of the windings 7 and is not affected by ambient temperature variations. Accordingly, I prefer to mount my signalling apparatus in such a manner that it is directly responsive to the temperature of the embedded portions of the windings 7.

Inserted in a suitable opening 9 formed in the laminated core 8 is a member 10, preferably of copper because of its high heat conductivity, but other suitable material having high heat conductivity may be used. The member 10 extends into the core 8 to within close proximity of the bottom of the slots and preferably into actual contact with the electrically insulated surface of the windings 7 so that the member not only rapidly follows temperature variations of the windings, but also maintains substantially the same temperature as the windings. The member 10 projects a short distance above the surface of the core 8. Mounted above the member 10 is a heat dissipating or cooling member 11 preferably formed of the same material as the heat conducting member. As best shown in Figures 2 and 4, the abutting faces 12 and 13 of both members are concavely curved both longitudinally and transversely and spaced a short distance apart. A portion 14 of the cooling member 11 extends axially of the motor and has an end portion 15 passing through a suitable opening in the air inlet bell 6 and projecting into the path of the entering cooling air. An alternative construction, not shown in the drawings, is to extend a portion of the cooling member 11 radially through a suitable opening in the motor housing 2 to project into the outside atmosphere. Both members 10 and 11 are enclosed in a sheath 16 of heat insulating material, except the lower portion of the member 10, which is in heat exchange contact with the inner portion of the core 8 or the surface of the windings 7, and the end portion 15 of the cooling member 11, which projects into the path of the cooling air. The entire assembly may be fastened to the core 8 by a strap 17 and screws 18, or otherwise suitably secured thereto.

From the construction thus far disclosed, it can be seen that the upper face 13 of the member 10 attains substantially the same temperature as the embedded portion of the windings 7, both because the member 10 has high heat conductivity and also because the insulating sheath 16 prevents the upper portion of the member 10 from losing heat to the surrounding core 8. It also will be seen that the abutting face 12 of the cooling member 11 will be substantially cooler than the face 13 of the member 10, and similarly will tend to approach the temperature of the end portion 15 projecting into the cooling air stream.

Mounted between the abutting faces 12 and 13 is a bi-metallic thermostatic strip 19 (Figure 2), concave in cross section, and its normal position having a longitudinal curvature designed to conform to the curvature of the surface 13 of the member 10 and to be in direct heat exchange contact therewith. Secured to the center of the strip 19 is a rod 20 which extends radially of the core 8 through a bore in the cooling member 11 to operate an electric switch, indicated generally by 21. The means for securing the rod 20 to the strip 19 may be a nut threaded thereon, and a suitable recess 22 is provided in the member 10 to accommodate the nut. Mounted on top of the cooling member 11 is a pair of superimposed leaf springs 23 and 24. The lower spring 23 carries an electrically insulated moving contact bar 25, while the upper spring 24 carries a pair of electrically insulated switch points 26 which are designed to complete an electrical circuit when contacted by the contact bar 25, as will be later explained. The rod 20 projects beyond the upper surface of the cooling member 11 and into operating engagement with the lower spring 23. A heat insulating tube 27 may be provided between the rod 20 and the wall of the bore to prevent heat from travelling from the thermostatic strip 19 to the cooling member 11.

The normal position of the strip 19, as shown in Figure 2, allows the contact bar 25 to remain in lowered position out of contact with the switch points 26. When the thermostatic strip becomes sufficiently heated by the member 10, by reason of its double curvature it will snap into the position shown by the dotted lines in Figures 2 and 4. In this actuated position, the contact bar 25 will be raised into contact with the switch points 26, thus closing the switch 21. By suitably constructing the bi-metallic strip 19, the temperature at which it will snap into actuated position can be predetermined. The strip is so designed that the predetermined actuating temperature is below the critical or limiting temperature of the windings 7, preferably several degrees or more.

When the strip 19 has snapped into actuated position, it will conform to the curvature of the face 12 of the cooling member 11 and be in heat exchange contact therewith. Accordingly, by reason of such contact and because of the larger mass of the cooling member 11, the strip 19 will be cooled rapidly to the temperature at which it will snap back into normal position, thus lowering the contact bar 25 and opening the switch 21. Thus, periodic opening and closing of the switch 21 will occur as long as the temperature of the windings 7 remains above the predetermined actuating temperature. As the temperature of the windings increases above the predetermined point, the frequency of actuation of the strip 19 will increase, because the higher the temperature of the face 13 of the member 10, the less time will be required to reheat the strip 19 to its actuating temperature. The length of time that the strip 19 will remain in actuated position will increase slightly with the increase in temperature of the heating face 13, but the time intervals when the strip 19 is in normal position will decrease.

Figure 5:
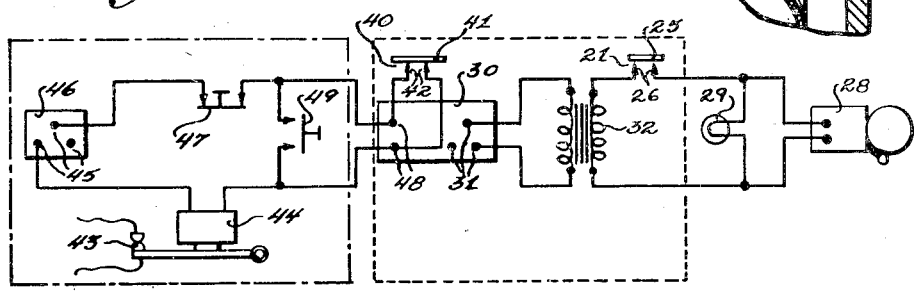
Figure 5 is a wiring diagram illustrating the use of my device with an electric motor.

The signalling apparatus of my invention is shown in the wiring diagram of Figure 5. The signalling device may be either audible, such as a bell 28, visual, such as a lamp 29, or both. I have shown both for purposes of illustration. The bell 28 and the lamp 29 are connected in parallel with a suitable source of electric power and the switch 21 is interposed in one of the power lines. The power may be taken directly from the terminal board 30 of the motor 1, using only two of the three terminals 31 as shown, or an independent source of electrical power, such as a battery, not shown in the drawings, may be used. To step down the voltage for the lamp 29 and bell 28, in case power is taken from the terminal board 30, either a transformer or a suitable resistance may be used. I have shown a transformer 32 in Figure 5 and a resistance 33 in Figure 6. That portion of Figure 5 enclosed by dotted lines, indicates the apparatus located within the motor housing 2. Preferably, the signalling devices 28 and 29 are mounted externally thereof.

The operation of the signalling device is as follows: when the temperature of the windings 7 of the motor reaches the predetermined point below the critical temperature, the signalling means is intermittently operated as the strip 19 is intermittently actuated by being heated by the member 10 and returned to normal position by being cooled by the cooling member 11. If the temperature of the windings increases beyond this predetermined point, the intervals of dead time between signals, i. e., lighting of the lamp 29 and sounding of the bell 28, will decrease. Thus, the operator of the motor has an indication of whether the temperature is continuing to rise above the predetermined point and is approaching the critical value. With this knowledge, the operator may relieve some of the load on the motor and so prevent its reaching the critical temperature and stopping if a temperature responsive safety switch is used. Not only does the signalling means serve to indicate a rise in temperature, but also it will indicate a decrease in temperature as well. Thus when the periods of dead time become longer, the operator of the motor has an indication that the load safety may be reapplied, so that the motor may be operated at all times with its highest safe load.

The invention also include automatic means for shutting off the power from the motor 1 if the temperature of the windings 7 reaches the critical or excessive value. The automatic means includes a temperature responsive means which is a modification of the signalling means. Referring again to Figures 2, 3, and 4, it will be seen that a relatively narrow recess 34 is provided in the member 10 below the upper surface 13 thereof. The recess 34 has longitudinal concavely curved upper and lower surfaces 35 and 36. Positioned in the recess is a bi-metallic thermostatic strip 37, flat in cross section, but in its normal position having a curvature designed to conform to the curvature of the lower surface 36 of the recess 34 and to be in direct heat exchange contact therewith. The strip 37 extends out of both ends of the recess 34 through suitable openings provided in the insulating sheath 16. One projecting end of the strip extends but a short distance beyond the sheath 16 and is spring pressed by any suitable means such as a spring element 38. The other projecting end portion extends some distance beyond the sheath 16 and is pivoted short of its end as at 39 to operate an electric switch, indicated generally at 40. The upper side of the pivoted end of the strip 37 carries an electrically insulated contact bar 41. Mounted on a supporting member are a pair of electrically insulated switch points 42, normally contacted by the bar 41 to complete an electrical circuit as will be explained later.

The actuation of the strip 37 is accomplished upon a predetermined temperature in the same manner as the strip 19. The snap action is provided, however, by the bias of the spring 38 instead of by a double curvature of the thermostatic strip. It is to be understood, moreover, that the construction of the strip 37 and switch 40 readily may be substituted for the construction of the signalling strip 19 and switch 21. By proper construction and adjustment, the strip 37 is designed to be actuated and snap into the position shown by the dotted lines in Figures 2 and 4 when the temperature of the windings 7 reaches the critical value. In this position, the contact bar 41 is lowered out of contact with the switch points 42, thus opening an electrical circuit. The strip 37, however, is not cooled rapidly when in its actuated position, because both the upper and lower surfaces 35 and 36 of the recess 34 are formed in the heating member 10, and accordingly are at approximately the same temperature. Hence, the strip 37 will not snap back into normal position until the temperature of the windings 7 drops below the critical point.

Referring again to Figure 5, there is shown the wiring diagram for the temperature responsive automatic power shut off. The dot-dash lines indicate apparatus located in the motor control box. The main switch contacts 43 of the motor are held in closed position by the energization of a holding coil 44 which is shown as taking its power from two of the three terminals 45 on the motor control terminal board 46, although any other suitable source of power may be used. Connected in series with the holding coil 44 are a manually operable cut out or stopping switch 47 and the temperature responsive safety switch 40, which normally is closed. Connecting terminals 48 may be mounted conveniently on the motor terminal board 30. Upon actuation of the strip 37, the safety switch 40 is opened and the holding coil 44 is deenergized, thus opening the main switch contacts 43, stopping the motor.

A normally open starting switch 49 may be connected in parallel with the safety switch 40. After having removed the load or other condition which caused the actuation of the safety switch 40, the motor may be restarted by closing the starting switch 49 without waiting for the motor to cool sufficiently to deactuate the safety switch. Such restarting of the motor will provide much more rapid cooling than if it were left to cool at rest.

Figure 6:
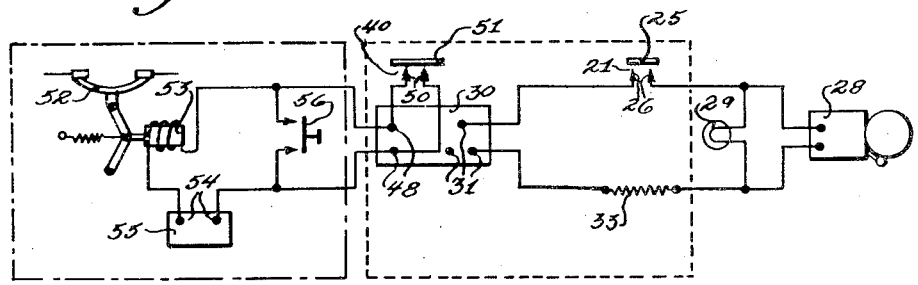
Figure 6 is a wiring diagram illustrating the use of my device with a generator.

Referring again to Figure 2, there is shown an alternative construction of the safety switch 40. Where my device is mounted on a generator instead of an electric motor, the safety switch 40 is designed normally to be open. Accordingly, electrically insulated switch points 50, shown in dotted lines, are designed to be contacted by an electrically insulated contact bar 51, shown in dotted lines on the under side of the end of the strip 37, when the strip is actuated. The wiring diagram shown in Figure 6 shows the application of the switch 40 to remove the load from a generator. A circuit breaker 52 connected in the generator load has its actuating coil 53 connected in series with the safety switch 40 and a source of power, which is shown as being the terminals 54 on the control terminal board 55 of the generator, although any other suitable source of power may be used. Upon actuation of the safety switch 40, the circuit breaker 52 is opened and the load removed from the generator. A normally open manually operable switch 56 is connected in parallel with the safety switch 40 for manual operation of the circuit breaker 52. The dotted lines of Figure 6 enclose apparatus located within the generator housing, while the dot-dash lines enclose apparatus located on the control terminal board 55 of the generator.

Referring now to Figures 7 and 8, there is shown a modified form of switch mechanism. The member 10 is mounted directly on the outer surface of the core 8 instead of in an opening therein. Thus, the heating member 10 is not directly responsive to the temperature of the windings, but is responsive to the heat of the surface of the core, the temperature of which nearly approaches that of the windings 7. The cooling member 11, mounted in spaced relation above the heating member 10, is cooled only by the air circulating within the housing 2 of the translating device. The abutting faces 57 and 58 of both members are convexly curved, both longitudinally and transversely and a thermostatic strip 59 is secured at its center to either the upper face 57 or the lower face 58. I have shown it as being secured to the face 58 of the member 10 by a bolt 60. The thermostatic strip 59, as in previously described modifications, normally conforms to the curvature of the upper surface 58 of the heating member 10 and obtains its snap action from its double curvature. Because the strip 59 is secured at its center, no end pivot or center push rod is necessary to operate a switch. One end of the strip 59 extends through a suitable opening in the sheath 16 of heat insulating material and carries an insulated electrical contact bar 25 which cooperates with the switch points 26.

As shown in Figure 7, this modified form of construction is designed for use as a signalling switch 21 by connecting the switch points 26 into a signalling circuit. By providing the strip 59, however, with the alternative contact bar 41, shown in dotted lines, and providing the alternative switch points 42, also shown in dotted lines, the strip may be positioned in a suitably shaped recess in a member 10 like the strip 37 shown in Figure 2 and employed as a motor safety switch. In this case, the switch points 42 would be connected into a circuit as illustrated in Figure 5. When the strip 59 is so positioned in a recess, the switch points 26 obviously could be connected into a generator control circuit like the switch points 50 of Figure 6. The actuating temperature of the strip 59 may be predetermined by proper construction as has been described previously.

A further modification of my invention is shown in Figures 9 and 10, wherein the heating and cooling members 10 and 11 are circular in cross-section. The abutting faces 61 and 62 of the cooling and heating members 11 and 10 are concave and the thermostatic element of the signalling switch 21 is in the form of a bi-metallic disc 63, normally dish-shaped to conform to the configuration of the face 62 of the heating member 10. The thermostatic element 64 of the safety switch 40 is constructed like the strip 37 of Figure 2 and is located in a passageway or recess 65 which extends through the heating member 10 and has concave upper and lower surfaces 66 and 67. The action of the thermostatic elements 63 and 64 corresponds to the action of elements 19 and 37, respectively, shown in Figure 2. By forming the heating member 10 with a circular cross section, it easily may be inserted in a drilled hole 68 in the stator core 8.

Still another modification of the signalling mechanism (not shown in the drawings) would be to eliminate the heating member 10 and utilize the core 8 itself as a heating member by shaping a portion of the surface of the core to correspond to any of the heating surfaces described. A suitably constructed thermostatic element then would be mounted directly between the core 8 and the superimposed cooling member.

While I have shown and described my temperature responsive signalling device as being applied specifically to electrical translating devices, it is obvious that other applications are possible. For example, any of the signalling devices described could be adapted to warn of the excessive heating of a bearing or the cooling fluid of a motor. Accordingly, the invention embraces all modifications and applications as fall within the spirit and scope of the appended claims.

I claim:

1. A thermally responsive mechanism comprising; a snap acting thermally responsive element responsive to a predetermined temperature, a heat conducting member, and a cooling member adapted to be maintained at a temperature lower than the temperature of said heat conducting member, said thermally responsive element being adapted in the normal position thereof to abut against said heat conducting member for direct heat exchange therewith and in the actuated position thereof to abut against said cooling member for direct heat exchange therewith, whereby said thermally responsive element is intermittently actuated by being heated to said predetermined temperature by said heat conducting member and cooled below said predetermined temperature by said cooling member, the frequency of actuation being a function of the temperature of said heat conducting member.

2. A thermally responsive signalling means for indicating temperature changes above a predetermined temperature comprising; a snap acting thermally responsive element responsive to a predetermined temperature, signalling means operable by a movable portion of said element, a heat conducting member, and a cooling member, said element being adapted in the normal position thereof to be in direct heat exchange relation with said heat conducting member and in the actuated position thereof in direct heat exchange relation with said cooling member, whereby said signalling means is intermittently operated when the temperature of said heat conducting member reaches or exceeds said predetermined temperature and at a frequency which is a function of the temperature of said heat conducting member.

3. Thermally responsive electric switch means comprising a pair of metallic members having high heat conductivity mounted end to end in spaced relationship, the opposed faces of said members being oppositely curved, a snap acting thermostatic element responsive to a predetermined temperature mounted between said members, and an electric switch operable by a movable portion of said element, said element being adapted in its normal position to conform to the configuration of and be in direct heat exchange relation with the curved end face of one of said members and in its actuated position to conform to the configuration of and be in direct heat exchange relation with the curved end face of the other of said members, the opposite end of said one member being adapted to be positioned in direct heat exchange relation with heat producing means, the opposite end of said other member being adapted to be positioned in cooling air, whereby said electric switch is intermittently operated when the temperature of the curved end face of said one member reaches or exceeds said predetermined temperature and at a frequency which is a function of the temperature of said heat producing means.

4. The structure set forth in claim 3, in which both members are encased in heat insulating material except for the opposite ends thereof.

5. The structure set forth in claim 3, in which the opposed faces of the members are concavely curved.

6. The structure set forth in claim 3, in which the opposed faces of the members are convexly curved.

7. The structure set forth in claim 3, in which the opposed faces of the members are concavely curved and a movable end portion of the thermostat extends from between said members to operate the switch.

8. The structure set forth in claim 3, in which the opposed faces of the members are concavely curved and a switch operating rod extends from the movable portion of the thermostatic element through a bore in one of said members to operate the switch.

9. The structure set forth in claim 3, in which the opposed faces of the members are convexly curved and a movable end portion of the thermostatic element extends from between said members to operate the switch.

10. The structure set forth in claim 3, including a recess in said one member, a second snap acting thermostatic element responsive to a predetermined temperature higher than said first mentioned predetermined temperature mounted in said recess, and a second electric switch operable by a movable portion of said second thermostatic element.

11. Thermally responsive electric switch means comprising a member having high heat conductivity adapted to be positioned in direct heat exchange relation with heat producing means, a recess in said member having oppositely curved opposed walls, a snap-acting thermostatic element responsive to a predetermined temperature mounted in said recess, and an electric switch operable by a movable portion of said element, said element being adapted in its normal position to be in direct heat exchange relation with one of said opposed walls and in its actuated position to be in direct heat exchange relation with the other of said oppposed walls, whereby said switch is in operated position as long as the temperature of said member is at or above said predetermined temperature.

12. The combination with a translating device provided with field windings of a thermally responsive signalling means for indicating a predetermined temperature of said windings lower than the critical temperature thereof and for indicating temperature changes of said windings above said predetermined temperature, said signalling means comprising a snap-acting thermostatic element responsive to a predetermined temperature in substantially direct heat exchange relation with said windings in the normal position thereof, electric switch means operable by a movable portion of said element, electric signalling means controlled by said switch means, and a cooling member adapted to be maintained at a temperature lower than the temperature of said windings, said element in the actuated position thereof being in direct heat exchange relation with said cooling member, whereby said signalling means is intermittently operated when the temperature of said windings reaches or exceeds said predetermined temperature and at a frequency which is a function of the temperature of said windings.

13. The combination with an electric translating device having field windings and cooled by circulating air of a thermally responsive signalling means for indicating a predetermined temperature of said windings lower than the critical temperature thereof and for indicating temperature changes of said windings above said predetermined temperature, said signalling means comprising a snap-acting thermostatic element responsive to a predetermined temperature in substantially direct heat exchange relation with said windings in the normal position thereof, electric switch means operable by a movable portion of said element, electric signalling means controlled by said switch means, and a cooling member adapted to be cooled by said circulating air, said element being in direct heat exchange relation with said cooling member in the actuated position thereof, whereby said signalling means is intermittently operated when the temperature of said windings reaches or exceeds said predetermined temperature and at a frequency greater than would be had by radiation or convection cooling alone of said element, said frequency being a function of the temperature of said windings.

14. The combination with a translating device having field windings and cooled by circulating air of a thermally responsive signalling means for indicating a predetermined temperature of said windings lower than the critical temperature thereof and for indicating temperature changes of said windings above said predetermined temperature, said signalling means comprising a first member of high heat conductivity mounted in substantially direct heat exchange relation with said windings and projecting therfrom, a second member of high heat conductivity mounted in end to end spaced relationship with the projecting end of said first member and having its other end positioned in the path of flow of said circulating air, the opposed ends of both of said members being oppositely curved, a snap-acting bimetallic thermostat mounted between said members, an electric switch operable by a movable portion of said thermostat, electric signalling means controlled by said switch, said thermostat being adapted in its normal position to conform to the configuration of and be in direct heat exchange relation with the curved end face of said first member and in its actuated position to conform to the configuration of and be in direct heat exchange relation with the curved end face of said second member, whereby said signalling means is intermittently operated through the actuation of said thermostat upon being heated to said predetermined temperature by said first member and cooled below said predetermined temperature by said second member, the frequency of operation of said signalling means being a function of the temperature of said windings.

15. The combination with a translating device having field windings of a thermally responsive means for indicating a predetermined temperature of said windings lower than the critical temperature thereof and for indicating temperature changes of said windings above said predetermined temperature, said means comprising: a thermostatic element, quickly deformable in response to temperatures at or above said predetermined temperature, said element, when undeformed, being in substantially direct heat exchange relation with said windings; means maintained at a temperature lower than said predetermined temperature for rapidly cooling said element, when thermally deformed, to a temperature lower than said predetermined temperature, whereby said element is intermittently deformed by winding temperatures at or above said predetermined temperature and at a frequency which is a function of said winding temperature; and electric signalling means controlled by said element.

16. A thermally responsive mechanism comprising: a heat conducting member; a cooling member adapted to be maintained at a temperature lower than a predetermined temperature; a thermally actuable, temperature-sensitive element quickly movable in response to said predetermined temperature, said element being adapted in the normal position thereof to abut against said heat conducting member for direct heat exchange therewith and in the actuated position thereof to abut against said cooling member for direct heat exchange therewith, whereby said element is intermittently actuated by being heated to said predetermined temperature by said heat conducting member and cooled below said predetermined temperature by said cooling member, the frequency of actuation being a function of the temperature of said heat conducting member.

CLARENCE W. INGELS.

REFERENCES CITED

The following references are of record in the file of this patent:

UNITED STATES PATENTS

| Number | Name | Date |
|---|---|---|
| 1,653,685 | Whittington | Dec. 27, 1927 |
| 1,703,803 | Widstrom | Feb. 26, 1929 |
| 2,141,775 | Varley | Dec. 27, 1938 |
| 2,223,531 | Putnam | Dec. 3, 1940 |